United States Patent [19]

Hawke

[11] Patent Number: 4,922,654

[45] Date of Patent: May 8, 1990

[54] PLANT OR SEEDLING SUPPORT STAKE

[76] Inventor: Dan N. Hawke, Box 14, Little Current, Ontario, Canada, P0P 1K0

[21] Appl. No.: 385,357

[22] Filed: Jul. 27, 1989

[30] Foreign Application Priority Data

Nov. 25, 1988 [CA] Canada .................................. 584,197

[51] Int. Cl.$^5$ .............................................. A01G 9/12
[52] U.S. Cl. .......................................... 47/47; 47/44; 248/174
[58] Field of Search ............... 248/530, 532, 533, 156, 248/300, 174, 508, 545; 47/44, 45, 46, 47, 39

[56] References Cited

U.S. PATENT DOCUMENTS

| | | | |
|---|---|---|---|
| 356,164 | 1/1887 | Schott | 47/47 |
| 1,377,832 | 5/1921 | Hanner | 47/47 |
| 2,152,018 | 3/1939 | Barnhart | 47/44 |

Primary Examiner—Henry E. Raduazo
Assistant Examiner—Jerrold D. Johnson
Attorney, Agent, or Firm—Nixon & Vanderhye

[57] ABSTRACT

The invention provides a one piece planar plant support comprising an elongated vertical stake which can be folded along its longitudinal axis, and a pair of integral and co-planar arms extending horizontally in opposite directions from the stake. Notches in the arms allow the arms to be secured together in a crossed-over position when the stake is folded. Each arm has a rectangularly shaped end portion at its free end which is folded inwardly toward the other arm when the arms are crossed forming a clasp of polygonal (triangular, or diamond or trapezium) configuration to retain a plant stem. When the notches are adjacent the free ends of the arms, they hold the arms in position defining a polygonal clasp.

20 Claims, 2 Drawing Sheets

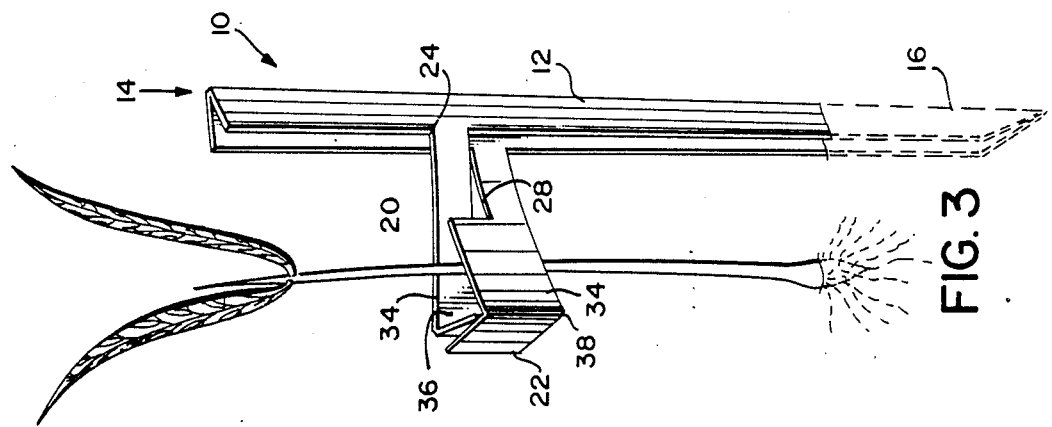
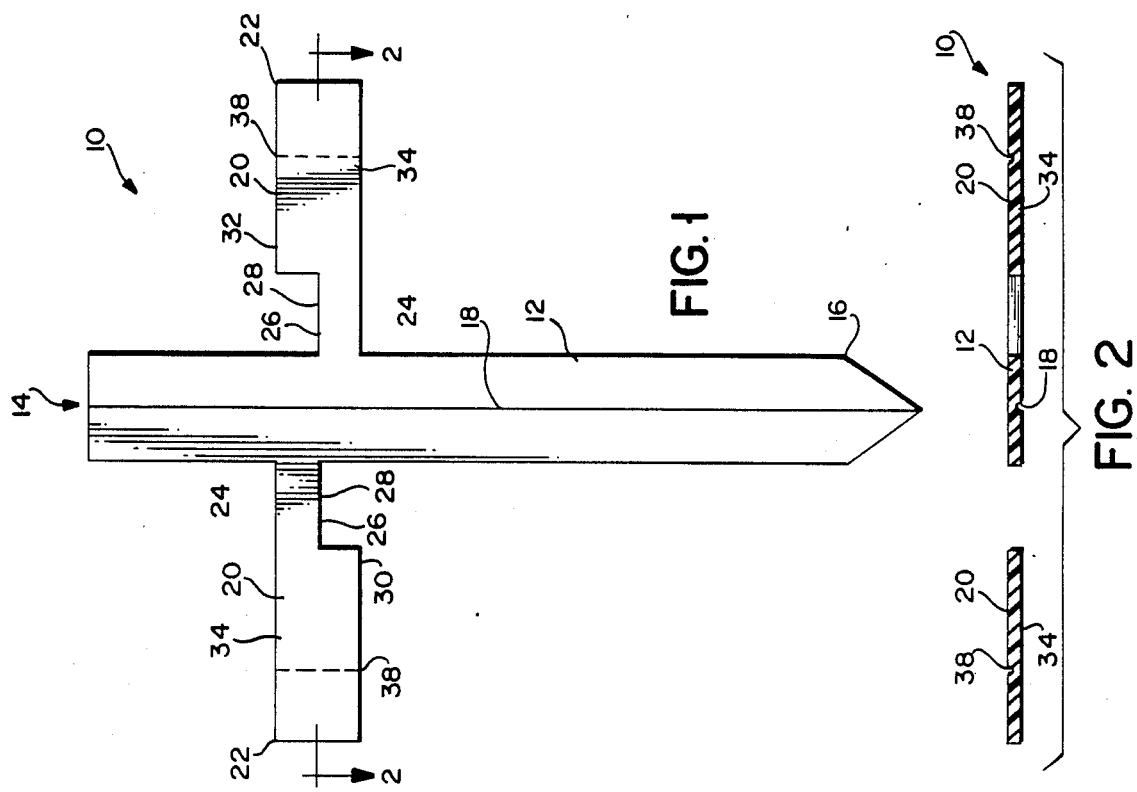

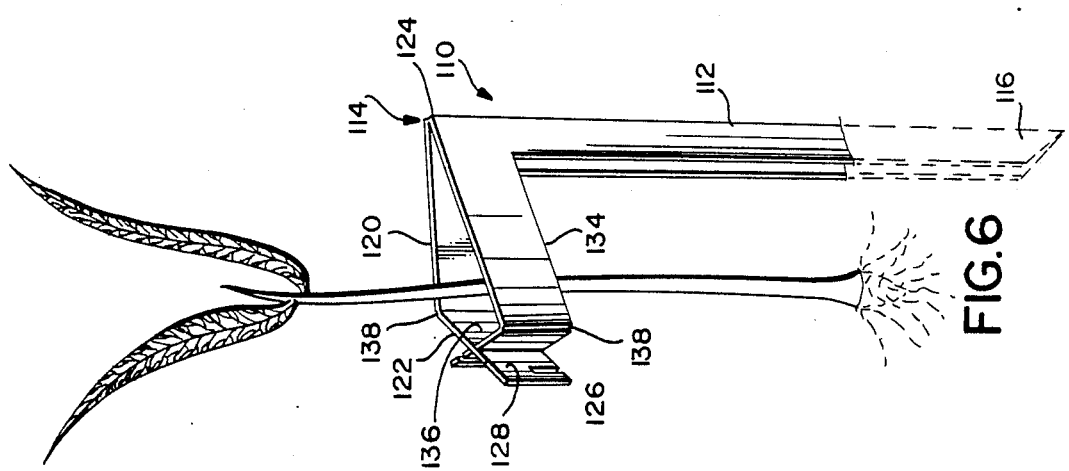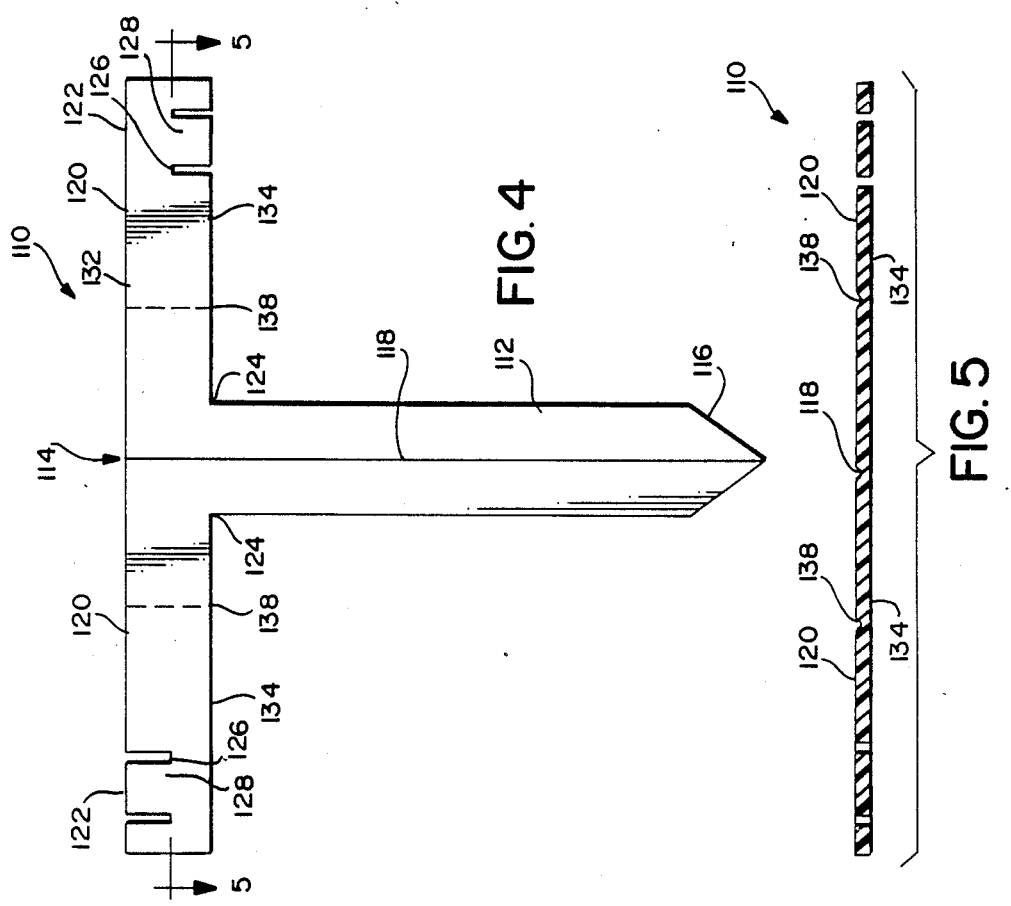

PLANT OR SEEDLING SUPPORT STAKE

FIELD OF THE INVENTION

The present invention relates to support stakes for plants or seedlings.

BACKGROUND OF THE INVENTION

Many devices are known for supporting plants, particularly seedlings such as tomato plants which need to be transplanted as the plant matures and which are often shipped in flats or pots for further transplanting in outdoor gardens. Often a vertical stake is used to support the stems of the delicate seedlings or the maturing plants and the plant or seedling is tied to the stake with string, wire or twist ties. However this taking and typing process is time consuming and cumbersome. The ties are prone to slipping, especially with the continual growth of the plant and the rough movement of shipping.

Various plant stakes have been designed to support plant stems, especially at the seedling stage, with clasps. One example can be seen in the U.S. Pat. No. 4,483,098, issued Nov. 20, 1984 to Anderson. However, in that device, the clasp was produced separate from the vertical supporting stake and the device therefore needed to be assembled by the end user with pins and fasteners and the like. Also, the device could not be produced in a simple stamping operation because the clasp was produced with a pre-formed arcuate shape.

A need exists for a plant support device which can be inexpensively and simply manufactured and which can be easily assembled by the end user.

SUMMARY OF THE INVENTION

The present invention provides a plant support which includes an elongated planar stake which can be vertically disposed adjacent a plant stem with the lower end anchored in the soil adjacent the plant. The stake is formed so it can be folded lengthwise, along its longitudinal axis. The support further includes a pair of planar resilient arms which are integral and co-planar with the stake. The arms extend horizontally from the stake in opposite directions. Each of the arms is formed with a notch intermediate its free and connected ends to allow the arms to be secured to each other in a cross-over position when the stake is folded along its longitudinal axis. Each arm is also formed with a rectangularly shaped end portion at its free end, which end portions can be folded inwardly toward each other when the arms are in the crossed-over position, formed a clasp of generally polygonal configuration to retain a plant stem.

In a preferred embodiment of the plant support of this invention the notches formed in the arms comprise rectangularly shaped cut-outs extending across at least half of the width of the arm, adjacent the stake from opposing directions such that the arm portion which remains is received and secured in the cut-out of the other arm when the arms are in the crossed-over position. This allows the arms to move, in a scissor-like manner, as the stake is pinched together along its longitudinal axis, thereby opening and closing the clasp at the arm ends.

The simple design of the plant support of this invention enables it to be manufactured as a one piece, integral unit in a simple and inexpensive stamping operation. In use, the device is assembled by folding the stake longitudinally, crossing the arms over and folding in the end portions of the arms to form the clasp. This avoids the time consuming operation of fastening together separate parts or typing strings to vertical stakes.

The invention also contemplates a method of supporting a pre-existing plant utilizing a plant support which comprises an elongated planar vertically disposed stake which can be folded along its longitudinal axis, and a pair of planar resilient arms integral and co-planar with the stake, extending horizontally from the stake in opposite directions, and having free and connected ends, each of the arms being formed with a notch intermediate its free and connected ends; comprising the steps of: Folding the stake along its longitudinal axis. Forcing the stake at an end thereof remote from the arms into the ground adjacent the plant. Crossing over the arms, around the plant, so that the arms define a clasp of generally polygonal configuration with the stem of the plant retained within that polygon. And, releasably securing the arms to each other to retain the polygonal configuration.

BRIEF DESCRIPTION OF THE DRAWINGS

FIG. 1 is a plan view of the plant support of this invention;

FIG. 2 is a sectional view taken along line 2—2 of FIG. 1, illustrating the fold lines in the stake and arms of the plant support;

FIG. 3 is a perspective view of the plant support, in its assembled state, supporting a plant seedling;

FIG. 4 is a plan view like FIG. 1 only showing a second embodiment of a plant support according to the invention; and FIGS. 5 and 6 are views comparable to those of FIGS. 2 and 3, but for the second embodiment of the plant support according to the invention.

DETAILED DESCRIPTION OF THE DRAWINGS

An exemplary plant support of this invention is illustrated in the drawings and is generally designated by the numeral 10. As seen in FIG. 1, the support 10 is preferably fabricated as a one piece, integral and planar unit. Most preferably it is stamped from a thin sheet of resilient plastic. Clearly, the dimensions and thickness of the device needed to provide sufficient rigidity for support will vary depending on the size and type of plant and seedling to be supported. For example, small tomato seedlings can be supported by a support which is about ten cm or more in height, stamped from plastic of about one mm in thickness. The dimensions given are exemplary, not critical guidelines and one skilled in the art will be able to vary the dimensions, according to the application, without difficulty.

Integral and co-planar with the stake 12 is a pair of arms 20, which extend horizontally from the stake 12 in opposite directions when the stake 12 is vertically disposed. Top portion 14 extends above the level of the arms 20. The bottom of the stake 12 is tapered (16) to a point to facilitate ground penetration. Each arm 20 has a free end 22 and a connected end 24. The arms 20 are located some distance from the lower end 16 of the stake 12, which distance will vary according to the size and type of the plant to be supported. In the embodiment of FIGS. 1-3, the arms 20 are located at about three quarters of the height of the stake 12, and this has been found, in conjunction with the dimensions given above, to provide sufficient rigidity for use with seedlings, such as tomato seedlings, of about twenty cm height. Here again, these numbers are provided as guidelines only and are not critical to the invention.

The arms 20 are each formed with a notch 26 extending into the width of the arm intermediate its free and connected ends 22 and 24. The notch 26 is located and sized to allow the arms 20 to be secured to each other in a crossed-over position when the stake 12 is folded longitudinally. This is best illustrated in FIG. 3. The notch 26 in the FIGS. 1-3 embodiment comprises a rectangularly shaped cut-out 28 which extends across about half the width of the arm. Each cut-out extends into the arm, adjacent the stake 12 from opposite directions to allow the arms 20 to be crossed over and secured together. Thus, in one arm 20, the cut-out 28 extends from the lower edge 30 of the arm across at least half the arm width, while in the other arm 20, the cut-out 28 extends from the upper edge 32 of the arm across at least half of the arm width. Each cut-out extends into the arm, adjacent the stake 12 from opposite directions to allow the arms 20 to be crossed over and secured together. Thus, in one arm 20, the cut-out 28 extends from the lower edge 30 of the arm across at least half the arm width, while in the other arm 20, the cut-out 28 extends from the upper edge 32 of the arm across at least half of the arm width. This allows the portion of each arm which is not cut away to be received and secured in the cut-out of the opposite arm when the stake is folded and the arms 20 are in the crossed-over position of FIG. 3. In this position, as the stake 12 is pinched together the arm portion within each cut-out can slide or move in a scissor-like manner.

The free ends 22 of the arms 20 are formed with rectangularly shaped end portions 34. These end portions 34 are formed to be folded toward each other when the arms 20 are in the crossed-over position, thereby forming a clasp 36 of triangular configuration, as illustrated in FIG. 3. To assist in the folding action, each end portions 34 is preferably formed, during the stamping process with a groove 38 which extends across the width of the arm 20, parallel to the longitudinal axis 14 and groove 18 of the stake 12. As seen in FIG. 2, the grooves 38 are stamped into the arms 20 from the opposite direction of the groove 18 in the stake 12, to allow for folding of the stake 12 and the arm end portions 34 in the proper directions.

Any number of sets of arms 20 may be provided along the length of the stake 12.

To assemble the support 10 the stake 12 is folded longitudinally, the arms 20 are crossed over and secured in the cut-outs 28 and the arm end portions 34 are folded toward each other. This results in the formation of the triangular shaped clasp 36, through which a plant stem can extend in supported relationship. By pinching together the stake 12 the arms 20 can move or slide in the cut-outs 28 in a scissor-like manner, as described above. This causes the arm end portions 34 to move apart, thereby opening the clasp 36. The clasp 36, therefore, can be secured in place around the plant stem, or thereafter removed, in a simple manner without damaging the plant.

A second embodiment of plant support according to the invention is illustrated in FIGS. 4 through 6, generally by reference numeral 110. In this embodiment structures comparable to those in the FIGS. 1 through 3 embodiment are illustrated by the same reference numeral only preceded by a "1".

The major distinction between the embodiment of FIGS. 4 through 6 and that of FIGS. 1 through 3 is in the configuration and location of each notch 126. comprising a rectangular shaped cut-out 128. In this embodiment the notches 126 are located adjacent the free ends 122 of the arms 120 in the rectangularly shaped end portions 134. For the right hand arm 120 in FIG. 4. the notch 126 opens to the bottom, while on the left hand arm 120 the notch 126 opens to the top, although obviously that may be reversed.

Another minor difference between the embodiment of FIGS. 4 through 6 and that of FIGS. 1 through 3 is that in the FIGS. 4 through 6 embodiment the top portion 114 does not extend above the level of the arms 120.

To assemble the support 110, the stake 112 is folded longitudinally, the arms 120 are crossed over. the arm end portions 134 are folded toward each other, and then the cut-outs 128 are intermeshed, and hold the arms in operative position relative to each other, as illustrated in FIG. 6. This results in the formation of a diamond or trapezium shaped clasp 136, through which a plant stem extends in supported relationship. In this embodiment the fact that the notches 126 are provided at the ends of the arms 120 results in the arms 120 being secured to each other at the ends thereof in a more positive manner than in the FIGS. 1 through 3 embodiment. However in this embodiment the arms 120 may still be readily detached from each other merely by effecting relative sliding movement between the cut-outs 128. Thus the device 110 can be secured in place around a plant and stem, or thereafter removed, in a simple manner without damaging the plant.

While the invention has been herein shown and described in what is presently conceived to be the most practical and preferred embodiments thereof, it will be apparent to those of ordinary skill in the art that many modifications may be made thereof within the scope of the invention, which scope is to be accorded the broadest interpretation of the appended claims so as to encompass all equivalent structures, devices, and methods.

What is claimed is:

1. A plant support comprising:
an elongated, planar, vertically disposed stake which can be folded along its longitudinal axis; and
a pair of planar resilient arms, integral and co-planar with the stake, extending horizontally from the vertical stake in opposite directions, each of the arms being formed with a notch intermediate its free and connected ends to allow the arms to be secured to each other in a crossed-over position when the stake is folded along its longitudinal axis, each of said arms being formed with a rectangularly shaped end portion at its free end, which end portions can be folded inwardly toward each other when said arms are in the crossed-over position, forming a clasp of generally polygonal configuration to retain a plant stem.

2. The plant support of claim 1, wherein the stake and integral arms are stamped from resilient sheet plastic.

3. The plant support of claim 2, wherein the stake is formed with a groove along its longitudinal axis and each of the arms is formed with a groove across the width of the rectangular end portion, parallel to the longitudinal axis of the stake, to allow the stake and the end portions of the arms to be folded.

4. The plant support of claim 3, wherein the notch in each arm is a generally rectangularly shaped cut-out from the arm adjacent the stake, one of the cut-outs extending from the upper edge of the arm to at least the midpoint in the width of the arm, the other cut-out extending from the lower edge of the arm to at least midpoint in the width of the arm, such hat, when the arms are in the crossed-over position, each cut-out receives and secures the opposite arm in the crossed-over position.

5. The plant support of claim 1, wherein the notch in each arm is a generally rectangularly shaped cut-out from the arm adjacent the stake, one of the cut-outs extending from the upper edge of the arm to at least the midpoint in the width of the arm, the other cut-out extending from the lower edge of the arm to at least midpoint in the width of the arm, such hat, when the arms are in the crossed-over position, each cut-out receives and secures the opposite arm in the crossed-over position.

6. The plant support of claim 5, wherein the stake and integral arms are stamped from resilient sheet plastic.

7. The plant support of claim 1, wherein the stake is formed with a groove along its longitudinal axis and each of the arms is formed with a groove across the width of the rectangular end portion, parallel to the longitudinal axis of the stake, to allow the stake and the end portions of the arms to be folded.

8. The plant support of claim 7, wherein the notch in each arm is a generally rectangularly shaped cut-out from the arm adjacent the stake, one of the cut-outs extending from the upper edge of the arm to at least the midpoint in the width of the arm, the other cut-out extending from the lower edge of the arm to at least midpoint in the width of the arm, such hat, when the arms are in the crossed-over position, each cut-out receives and secures the opposite arm in the crossed-over position.

9. A plant support as recited in claim 1 wherein the notch in each arm is a generally rectangularly shaped cut-out adjacent, but spaced from, its free end, one of the cut-outs extending from the upper edge of the arm toward at least about the midpoint in the width of the arm, and the other cut-out extending from the lower edge of the arm toward at least about the midpoint in the width of the arm, so that when the arms are in crossover position each cut-out receives and secures the opposite arm in the cross-over position, and the arms define a generally diamond or trapezium shape clasp.

10. A plant support as recited in claim 9 wherein each of the arms is formed with a groove across the width of the rectangular end portion perpendicular to the upper and lower edges of the arm, to facilitate folding of the end portions of the arms.

11. A plant support as recited in claim 10 wherein said stake is formed with a groove along its longitudinal axis to facilitate folding of the stake to facilitate its penetration into the ground.

12. A plant support as recited in claim 11 wherein the top of the stake is generally coincident with the upper edges of the arms, and where the bottom of the stake is tapered to a point so as to facilitate ground penetration.

13. A plant support as recited in claim 9 wherein the top of the stake is generally coincident with the upper edges of the arms, and where the bottom of the stake is tapered to a point so as to facilitate ground penetration.

14. A plant support as recited in claim 1 wherein the top of said stake extends above the upper edges of said arms.

15. A plant support as recited in claim 14 wherein the bottom of said stake tapers to a point to facilitate ground penetration.

16. A plant support comprising:
an elongated vertically disposed stake tapered to a point at the bottom end thereof so as to faciltiate ground penetration;
a pair of resilient arms integral with the stake and extending horizontally from the stake in opposite directions each of the arms having a free end remote from the stake, and a connected end connected to the stake;
means for defining a notch in each of said arms intermediate its free and connected end to allow the arms to be secured to each other in a crossed-over position, to form a clasp of generally polygonal configuration to retain a plant stem within the polygon.

17. A plant support as recited in claim 16 wherein said notch means further comprise means for holding the arms together adjacent the free ends thereof when forming the clasp.

18. A plant support as recited in claim 17 wherein said clasp has a generally diamond or trapezium shaped configuration.

19. A plant support as recited in claim 16 wherein said clasp has a generally triangular shaped configuration.

20. A method of supporting a pre-existing plant utilizing a plant support which comprises an elongated planar vertically disposed stake which can be folded along its longitudinal axis, and a pair of planar resilient arms integral and co-planar with the stake, extending horizontally from the stake in opposite directions, and having free and connected ends, each of the arms being formed with a notch intermediate its free and connected ends; comprising the steps of:
folding the stake along its longitudinal axis;
forcing the stake at an end thereof remote from the arms into the ground adjacent the plant;
crossing over the arms, around the plant, so that the arms define a clasp of generally polygonal configuration with the stem of the plant retained within that polygon; and
releasably securing the arms to each other to retain the polygonal configuration.

* * * * *